Figure 1:
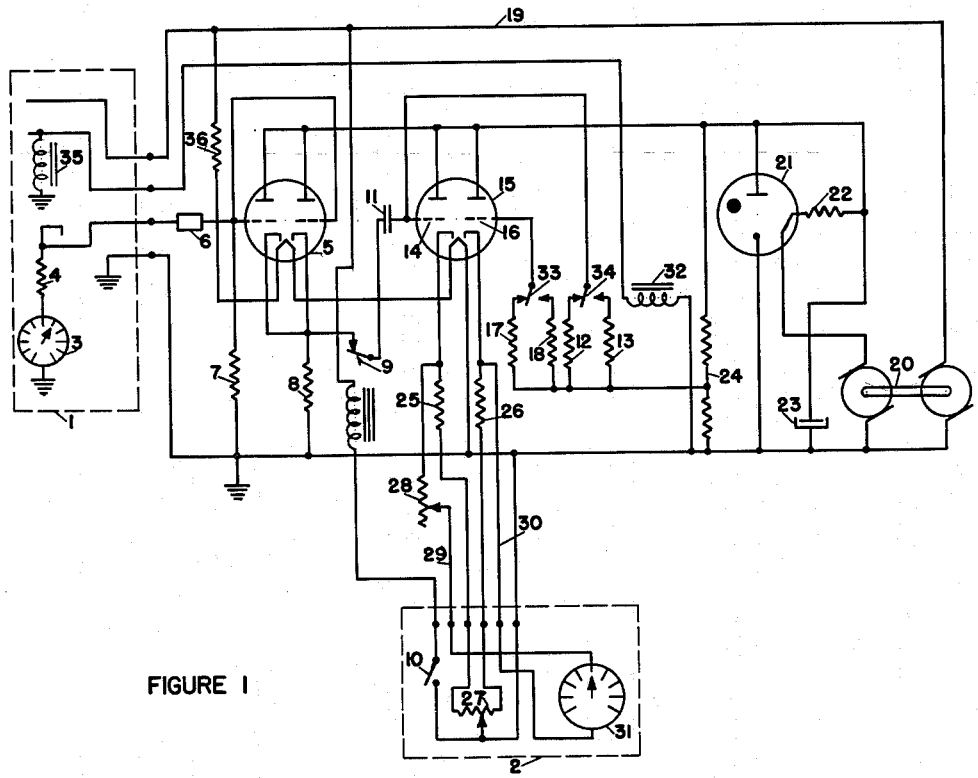

March 17, 1953 R. HOFSTADTER 2,632,038
VERTICAL VELOCITY INDICATOR
Filed Dec. 13, 1944

INVENTOR.
Robert Hofstadter
BY
Sawyer & Kennedy

Patented Mar. 17, 1953

2,632,038

UNITED STATES PATENT OFFICE 2,632,038

VERTICAL VELOCITY INDICATOR

Robert Hofstadter, New York, N. Y., assignor to The Norden Laboratories Corporation, New York, N. Y., a corporation of Connecticut Application December 13, 1944, Serial No. 568,014

6 Claims. (Cl. 175—183)

This invention relates to improvements in indicators, and more particularly to vertical velocity indicators for aircraft.

An object of the invention is to provide an electrically operated vertical velocity indicator which will eliminate the lag and inaccuracy of barometric and other devices now in use.

A second object of the invention is to provide a velocity indicating unit adapted to use as an attachment for existing altimeters.

A further object of the invention is to provide means for eliminating non-linearity of altimeter indication in the vertical velocity indication.

Another object of the invention is to provide an improved form of computer circuit for coupling an indicating meter to the source of indicating voltage.

With these and other objects which will appear in the following full description in mind, the invention consists in the combinations and arrangements of parts and details of construction which will now first be fully described in connection with the accompanying drawing and then pointed out more particularly in the appended claims.

Figure 2:
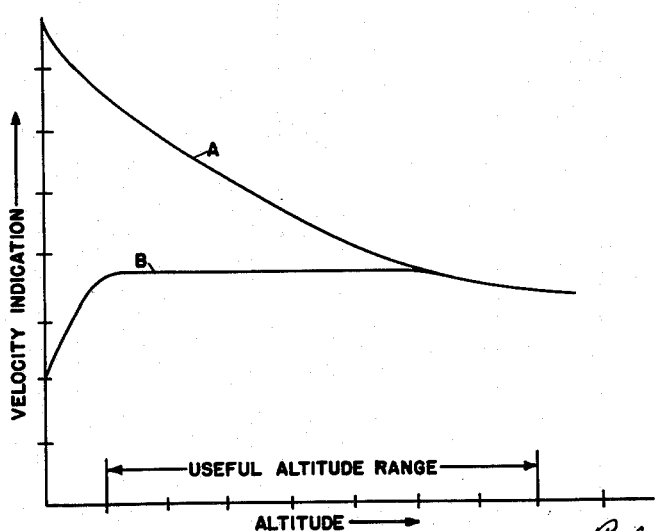

In the drawings:

Figure 1 is a circuit diagram of a device embodying the invention in a preferred form of embodiment; and Figure 2 is a graphical chart illustrating the correction of non-linearity of an altimeter vertical velocity characteristic.

Referring now to Figure 1, the equipment shown comprises an altimeter designated generally by the numeral 1, a velocity meter and associated equipment mounted on the instrument panel, and which are designated collectively by the numeral 2, and the computer unit comprising the remainder of the equipment. As indicated, these three units will normally be connected together by plugs and cables of required length to permit convenient installation, removal and arrangement of the parts within the aircraft.

Only so much of the altimeter output as is necessary to a full understanding of the present invention is shown in the drawing. As there shown, the output consists of the meter 3 and series resistor 4, across which the output voltage representing the altitude is developed, and which is indicated by the suitably calibrated meter 3. The altimeter may be a reflection type radio altimeter such as described in Civil Aeronautics Bulletin No. 29 at pp. 86 and following, or any other voltage output altimeter.

The altimeter output voltage is applied to the input of cathode follower 5, this input comprising a series resistor 6, which is a non-linear resistor of the type marketed under the trade names Thyrite or Varistor, and the grid circuit load resistor 7. The cathode follower 5 accordingly develops across its cathode resistor 8 a voltage proportional to the altimeter output voltage as modified by the non-linear resistor 6. This voltage is applied through relay switch 9, controlled by switch 10 on the instrument panel 2, to condenser 11 which forms, together with the resistor 12 (in the switch position shown), and part of the resistor 24, a differentiating circuit by means of which a voltage representing the time derivative of the output of the cathode follower 5 is applied to the grid 14 of the twin cathode follower 15. A resistor 17 balancing the resistor 12 is provided in the grid circuit for the grid 16 of the other half of this tube, and the plate voltage and grid bias voltage may be taken from any convenient source. In the construction shown, the aircraft D. C. utility voltage is taken from the altimeter through line 19 and operates the motor generator 20, which provides a high voltage direct current. The D. C. utility voltage also operates the tube heaters through series resistor 36. This high voltage direct current supply is stabilized at the desired value and smoothed out by the voltage regulator tube 21, resistor 22 and electrolytic condenser 23. A bias voltage for the grids of the twin cathode follower 15 is taken off the voltage divider 24 so that the quiescent voltage of these grids is positive with respect to ground and slightly negative with respect to the cathodes.

The cathode resistors 25 and 26 of the tube 15 are connected to ground through potentiometer 27 and may be balanced by adjusting this potentiometer, the switch 9, above referred to, being opened to provide zero signal during this adjustment so that the balanced condition is indicated by a zero reading of the output meter 31. The output of the twin cathode follower 15 is applied through connections 29 and 30 to the milliameter 31, which may be graduated to read directly in velocity in feed per second, feet per minute or other convenient units, as desired. Resistor 28, in series with the meter 31, provides for matching individual meter and circuit characteristics by regulating the sensitivity.

Inasmuch as radio reflecting altimeters customarily provide for operation over two different ranges of altitude so that the voltage variation in the output for a given vertical velocity is different for the two ranges, means is provided in the instrument of the present invention for corresponding velocity ranges. This means consists of a relay switch having a winding 32 which operates the armatures 33 and 34 so as to permit switching over from the grid circuit input resistors 12 and 17 to grid circuit input resistors 13 and 18. The winding 32 being connected across the winding of a similar range changing relay switch 35 in the altimeter, the switch-over in the velocity attachment occurs automatically whenever the altimeter range is changed.

While it is possible to calibrate a non-linear output for an altimeter or other instrument, it will be observed that the differentiation of such an output to furnish a velocity cannot generally furnish the correct velocity at one altitude if it does so at another, and likewise, it is not possible to calibrate such a velocity indication without employing a special computer. These difficulties are very simply eliminated in the present device by the non-linear input to cathode follower 5. By selection of a suitable relative value for the grid load resistor 7 and utilization of a non-linear resistor 6 with a suitable characteristic, it is found possible to eliminate non-linearity of the altimeter output very effectively.

Referring to Figure 2 of the drawing, the curve A represents the velocity indication obtained from the uncorrected altimeter output, the velocity being assumed as constant, so that the variation in ordinate of the curve represents the error in velocity indication. In this case the voltage-altitude characteristic of the altimeter is hyperbolic in form so that the proportionality coefficient between the vertical velocity and the derivative of the voltage decreases with increasing altitude according to a square law relationship, the resulting characteristic being thus parabolic in character. By utilizing a non-linear resistor 6 of the type referred to, a very accurate correction may be made. Such resistors, as is well known, have parabolic current-voltage characteristics and are available with a wide range of selection of exponents. (Brownlee—"The calculation of circuits containing Thyrite"—General Electric Review, April and May, 1934, and General Electric Co. circular "Thyrite—A G.-E. Resistance Material.") By a simple process of calculation one or more non-linear resistors may be selected to match a given non-linear output and give a correct velocity or rate of change indication. In Fig. 2, the curve B shows the corrected voltage-velocity characteristic of the circuit of Fig. 1 and it will be observed that this curve is substantially flat, indicating a correct velocity reading which is independent of altitude over the useful range of the altimeter instrument.

A further characteristic of the non-linear differentiating circuit which should be noted is that it is substantially unaffected by thermal variation in the resistance of resistor 6, which affects the static characteristic, but has little effect on the dynamic characteristics.

In the instrument chosen for illustration, the altimeter is designed for operation in two ranges, covering, respectively, altitudes from zero to four hundred feet and altitudes from zero to four thousand feet. Figure 2 may be understood as showing operation for either of the altimeter ranges, the adjustment of the circuit by relay switch 32 providing for suitable compensating resistance change. In the case illustrated, where the higher altimeter range has ten times the width of the lower, the high range resistors 13 and 18 will have ten times (due allowance for series resistance of a portion of the drop wire 24 being made) the resistance of the low range resistors 12 and 17, so that the velocity indication is unaffected by change from one range to the other. Change of range through adjustment of these resistance values changes the time constant of the circuit, which is the product of the resistance and capacity of the differentiating condenser and resistor, and correspondingly changes the lag in the velocity indication. This lag may, however, be kept so low in the present device as to be no more than a small fraction of the lag in previous instruments and may be reduced to any desired value by increasing sensitivity of the output meter.

Correction of non-linearity of altimeter response may be carried to any extent desired. Ordinarily a portion of the lower part of the range will be ignored, since it represents only a few feet on the low range scale and the low range scale is utilized instead of the lowest part of the high range.

The circuit shown effectively prevents the introduction of error or loss of sensitivity through current drain, due to the high input impedance of the cathode follower circuit. Thus, the resistors 6 and 7 which form the input for cathode follower 5 may be of sufficiently high resistance to make current drain on the altimeter output negligible, while the cathode resistor 8 forming the output for cathode follower 5 may be of low resistance so that its impedance is small with respect to the impedance of the differentiating circuit. Accordingly, since the differentiating circuit is included in the load across the resistor 8, its effect is negligible. Similarly, the high impedance of condenser 11 and resistor 12 or 13 prevents current drain on the resistor 8, while the impedance of the cathode resistors 25 and 26 matches the impedance of the meter 31. The input to cathode follower 5 being D. C., suitable grid bias is provided by the cathode resistor 8. In the case of the tube 15, however, the grids are biased from the voltage divider 24, as previously stated, so that the quiescent grid voltages are slightly negative with respect to the cathodes, and the cathode follower action results in the cathode connected to resistor 25 following grid 16 so as to maintain this bias. By my construction the values of the resistors 25 and 26 are raised so that both sides of tube 15 are good cathode followers. Resistors having resistance values which are too large cannot be employed since in such case the impedance match to the meter 31 would be unsatisfactory. Large resistors would be required, however, if no bias were employed. The advantage of my circuit is that it is quite stable.

What is claimed is:

1. A vertical velocity indicator for aircraft, including in combination an altimeter adapted to produce a unidirectional signal having a voltage proportional to the altitude of the aircraft above the earth, a first thermionic tube having a grid and a cathode, high impedance input means including a nonlinear resistor for impressing said unidirectional signal upon said grid, a resistor between cathode and ground forming an output channel of low impedance, a second thermionic tube having a grid and a cathode, an input channel to said second thermionic tube for impressing the voltage drop across said cathode resistor upon the grid of said second thermionic tube, said channel including a capacitor connected between the cathode of said first thermionic tube and the grid of said second thermionic tube and a resistor connected between the grid of said second thermionic tube and ground, a resistor connected between the cathode of said second thermionic tube and ground, the output signal across said second cathode resistor forming the desired signal.

2. A vertical velocity indicator for aircraft, including in combination an altimeter adapted to produce a unidirectional signal having a voltage proportional to the altitude of the aircraft above the earth, a first thermionic tube having a grid and a cathode, high impedance input means including a nonlinear resistor for impressing said unidirectional signal upon said grid, a resistor between cathode and ground forming an output channel of low impedance, a second thermionic tube having a grid, an input channel for impressing the voltage drop across said cathode resistor upon the grid of said second tube including a capacitor connected between the cathode of said first thermionic tube and the grid of said second thermionic tube and a resistor connected between the grid of said second thermionic tube and ground, said capacitor and resistor thus connected forming a differentiating circuit adapted to produce a signal which is a function of the change of altitude with respect to time, the output of said second thermionic tube forming the desired signal.

3. A vertical velocity indicator as in claim 2 in which said second thermionic tube is provided with a cathode, a resistor of low impedance connected between the cathode of said second tube and ground whereby said second thermionic tube acts as a cathode follower and means for impressing the output of said cathode follower upon an indicating means to indicate the desired vertical velocity.

4. A vertical velocity indicator as in claim 2, including means for varying the resistance of the differentiating circuit resistor to match the altimeter output characteristic in a plurality of altiude ranges.

5. A vertical velocity indicator as in claim 2 in which said second thermionic tube is provided with a pair of cathodes and a second grid, a resistor connected between the first cathode of said second thermionic tube and ground, a resistor connected between the second cathode of said second thermionic tube and ground, means for impressing a stable grid bias upon said second grid, a voltmeter connected across said cathodes, said voltmeter being calibrated in units of desired vertical velocity.

6. A vertical velocity indicator as in claim 2 in which said second thermionic tube is provided with a pair of cathodes and a second grid, a resistor connected between the first cathode of said second thermionic tube and ground, a resistor connected between the second cathode of said second thermionic tube and ground, means for impressing a stable grid bias upon said second grid, a voltmeter connected across said cathodes, said voltmeter being calibrated in units of desired vertical velocity, and means for varying the relative resistance of the cathode resistors of said second thermionic tube to balance the resistance therebetween.

ROBERT HOFSTADTER.

REFERENCES CITED

The following references are of record in the file of this patent:

UNITED STATES PATENTS

| Number | Name | Date |
| --- | --- | --- |
| 1,889,876 | Pellerin et al. | Dec. 6, 1932 |
| 2,217,220 | Floyd | Oct. 8, 1940 |
| 2,244,369 | Martin | June 3, 1941 |
| 2,251,973 | Beale et al. | Aug. 12, 1941 |
| 2,266,449 | Ullrich | Dec. 16, 1941 |
| 2,268,587 | Guanella | Jan. 6, 1942 |
| 2,301,115 | Gilbert | Nov. 3, 1942 |
| 2,324,215 | Kinsburg | July 13, 1943 |
| 2,360,523 | Simmons | Oct. 17, 1944 |
| 2,373,145 | Sensiper | Apr. 10, 1945 |

OTHER REFERENCES

"Electric Industries," Aug. 1943, pp. 71-72.